(12) United States Patent
Ansay et al.

(10) Patent No.: US 11,379,213 B1
(45) Date of Patent: Jul. 5, 2022

(54) DECENTRALIZED IDENTIFIERS FOR SECURING DEVICE REGISTRATION AND SOFTWARE UPDATES

(71) Applicant: Equinix, Inc., Redwood City, CA (US)

(72) Inventors: Rafael Lean de Vera Ansay, Singapore (SG); James Kempf, Mountain View, CA (US); Oleg Berzin, Huntingdon Valley, PA (US); Chen Xi, Singapore (SG); Imam Sheikh, Redwood City, CA (US)

(73) Assignee: EQUINIX, INC., Redwood City, CA (US)

( * ) Notice: Subject to any disclaimer, the term of this patent is extended or adjusted under 35 U.S.C. 154(b) by 49 days.

(21) Appl. No.: 17/112,588

(22) Filed: Dec. 4, 2020

Related U.S. Application Data

(60) Provisional application No. 62/944,945, filed on Dec. 6, 2019.

(51) Int. Cl.
   *G06F 8/65* (2018.01)
   *G06F 21/44* (2013.01)
   (Continued)

(52) U.S. Cl.
   CPC ............ *G06F 8/65* (2013.01); *G06F 21/44* (2013.01); *H04L 9/3247* (2013.01); *H04L 63/166* (2013.01); *H04L 2209/38* (2013.01)

(58) Field of Classification Search
   CPC ..... G06F 8/65; G06F 8/60; G06F 8/71; G06F 21/44; H04L 67/34; H04L 9/3247; H04L 63/166; H04L 2209/38
   See application file for complete search history.

(56) References Cited

U.S. PATENT DOCUMENTS 9,886,267 B2   2/2018   Maheshwari et al.
9,948,552 B2   4/2018   Teng et al.
(Continued)

OTHER PUBLICATIONS

Markus Luecking et al.; Decentralized Identity and Trust Management Framework for Internet of Things; IEEE; 9 pages; retrieved on Dec. 22, 2021 (Year: 2020).*

(Continued)

*Primary Examiner* — S. Sough
*Assistant Examiner* — Cuong V Luu
(74) *Attorney, Agent, or Firm* — Shumaker & Sieffert, P.A

(57) ABSTRACT

Techniques for a secure device registration and software update using Decentralized Identifiers (DIDs). For example, a method includes sending, by a device and to a data store, a request for a software update published by a software publisher, wherein the request includes a verifiable credential for the device including a DID of the device; receiving, by the device and from the data store, a verifiable credential for the software update, wherein the verifiable credential includes a DID of the software publisher; determining, by the device, whether the software update is newer than software on the device; obtaining, by the device, the software update from the software publisher from a location specified by the verifiable credential; verifying, by the device, the software update based on the verifiable credential; and in response to verifying the software update based on the verifiable credential, installing, by the device, the software update.

17 Claims, 4 Drawing Sheets

(51) Int. Cl.
  *H04L 29/06* (2006.01)
  *H04L 9/32* (2006.01)
  *H04L 9/40* (2022.01)

(56) References Cited

U.S. PATENT DOCUMENTS

| | | | |
|---|---|---|---|
| 10,129,078 | B2 | 11/2018 | Kumar et al. |
| 2008/0052698 | A1* | 2/2008 | Olson ................. G06F 9/44536 717/168 |
| 2018/0343126 | A1 | 11/2018 | Fallah et al. |
| 2020/0065763 | A1 | 2/2020 | Rosinzonsky et al. |
| 2020/0349276 | A1* | 11/2020 | Murdoch ............ G06F 21/6245 |

OTHER PUBLICATIONS

Bander Alzahrani; An Information-Centric Networking Based Registry for Decentralized Identifiers and Verifiable Credentials ; IEEE; pp. 137198-137208; retrieved on Dec. 22, 2021 (Year: 2020).*

U.S. Appl. No. 17/019,001, filed Sep. 11, 2020, naming inventors Kempf et al.

U.S. Appl. No. 17/100,399, filed Nov. 20, 2020, naming inventors Kempf et al.

"Ipfs/ipfs: Peer-to-Peer hypermedia protocol" GitHub, Retrieved: https://github.com/ipfs/ipfs, Accessed Apr. 14, 2021, 9 pp.

"DID Specification Registries," W3C Editor's Draft Apr. 2, 2021, Retrieved: https://w3c.github.io/did-spec-registries/#did-methods, Accessed Apr. 2, 2021, 44 pp.

Rein et al., "The Remote Attestation NFV Use Cases draft-rein-remote-attestation-nfv-use-cases-00," 2018 IETF Trust, Network Working Group: Internet Draft, Mar. 5, 2018, 11 pp.

"Network Functions Virtualisation (NFV) Release 3; Licensing Management; Report on License Management for NFV," ETSI GR NFV-EVE 010 V3.1.1, Dec. 2017, 31 pp.

"Network Functions Virtualisation (NFV)," ETSI, Retrieved Apr. 14, 2021 from: http://web.archive.org/web/20190420190232/https://www.etsi.org/technologies/nfv, Accessed Apr. 20, 2019, 18 pp.

"Home—DPDK,"Linux Foundation, Retrieved Apr. 14, 2021 from: https://web.archive.org/web/20190515153922/https://www.dpdk.org/, Accessed May 15, 2019, 4 pp.

"Build the Future of Open Infrastructure," Openstack Foundation, Retrieved Apr. 14, 2021 from: https://web.archive.org/web/20190514161111/https://www.openstack.org/, Accessed May 14, 2019, 8 pp.

Reichert, "Ericsson: Expired certificate caused O2 and Softbank Outages," ZDNet, Retrieved Apr. 14, 2021 from: https://web.archive.org/web/20190524042438/https://www.zdnet.com/article/ericsson-expired-certificate-caused-o2-and-softbank-outages/. Accessed May 24, 2019, dated Dec. 6, 2018, 4 pp.

"A Primer for Decentralized Identifiers," Decentralized Identity Foundation, Retrieved Apr. 14, 2021 from: https://w3c-ccg.github.io/did-primer/. Accessed May 19, 2019, dated Dec. 29, 2020, 8 pp.

Sabadello, "A Universal Resolver for self-sovereign identifiers," Retrieved Apr. 14, 2021, from: https://medium.com/decentralized-identity/a-universal-resolver-for-self-sovereign-identifiers-48e6b4a5cc3c, Accessed May 16, 2019, dated Nov. 1, 2017, 5 pp.

"Decentralized Identifiers (DIDs) v0.12," W3C, Retrieved Apr. 14, 2021, from: http://web.archive.org/web/20190523111828/https://w3c-ccg.github.io/did-spec/, Accessed May 23, 2019, 45 pp.

"RSA Signature Suite 2018" W3C, Retrieved Apr. 14, 2021, from: https://web.archive.org/web/20190725234817/https://w3c-dvcg.github.io/lds-rsa2018/, Accessed Jul. 25, 2019, 5 pp.

"Linked Data Signatures 1.0," W3C, Retrieved Apr. 14, 2021, from: https://web.archive.org/web/20190709115729/https://w3c-dvcg.github.io/ld-signatures/, Accessed Jul. 9, 2019, 14 pp.

"Decentralized Identity: Own and control your identity," Microsoft, Retrieved Apr. 14, 2021, from: https://web.archive.org/web/20190527123600/https://query.prod.cms.rt.microsoft.com/cms/api/am/binary/RE2DjfY, Accessed May 27, 2019, 23 pp.

"Verifiable Credentials Data Model 1.0," Retrieved Apr. 14, 2021, from: https://www.w3.org/TR/vc-data-model/, Nov. 19, 2019, 122 pp.

"Sidetree Entity Protocol," Github, Retrieved Apr. 14, 2021, from: https://github.com/decentralized-identity/did-methods/blob/master/sidetrees/explainer.md, last updated Apr. 7, 2018, 10 pp.

Buchner, "The Sidetree Protocol: Scalable DPKI for Decentralized Identity," Retrieved Apr. 14, 2021, from: https://medium.com/decentralized-identity/the-sidetree-scalable-dpki-for-decentralized-identity-1a9105dfbb58, Feb. 27, 2019, 6 pp.

"Decentralized-identity/secure-data-store," Github, Retrieved Apr. 14, 2021 from: https://web.archive.org/web/20201107153954/https://github.com/decentralized-identity/secure-data-store, Accessed Nov. 7, 2020, 2 pp.

"Decentralized Identifiers (DIDs) v0.13: Data Model and Syntaxes," W3C, Retrieved Apr. 14, 2021, from: https://web.archive.org/web/20190619085145/https://w3c-ccg.github.io/did-spec/, Accessed Jun. 19, 2019, 45 pp.

Wright et al., "JSON Schema: A Media Type for Describing JSON Documents: draft-handrews-json-schema-02," Internet Engineering Task Force: Internet-Draft, Sep. 16, 2019, 75 pp.

Roman et al., "On the features and challenges of security and privacy in distributed internet of things," Computer Networks, vol. 57, Issue 10, Jul. 5, 2013, 14 pp.

* cited by examiner

```
root@5930303b3099a0:~/decentralized-identifiers/ionic-iot/lib# ./ionic.sh upgrade-software
Software Upgrade start.
Authentication Successful. This device is authorized to access the Hub
Latest Version is 2.0.0
Current Version is 1.0.0
Software Update is available
Downloading latest software from: https://file-examples.com/wp-content/uploads/2017/02/zip_5MB.zip ...
Download Successful.
Verifying signature...
Image Signature: 335b28104b431843103e4f16464d6523b45a0a43e7191daa0620f5927b6419ce3495bc57776204e8
e077de01e3f25162c53e1409a8702415206a73e9e
Public Key Hex : 0320655162a85fb0043c6185202a0a2f17f039f018140f7e64b596c49ea0b1d849
Type : EcdsaKoblitzSignature2016
Verifying successful.
Software is OK and is ready for installation
root@5930303b3099a0:~/decentralized-identifiers/ionic-iot/lib#
```

FIG. 4

DECENTRALIZED IDENTIFIERS FOR SECURING DEVICE REGISTRATION AND SOFTWARE UPDATES

This application claims the benefit of U.S. Provisional Application No. 62/944,945, filed Dec. 6, 2019, the entire content of which is incorporated by reference herein.

TECHNICAL FIELD

This disclosure relates to computing systems and, in various examples, to securing device registration and software updates.

BACKGROUND

Enterprises are increasingly making use of "smart" devices, i.e., physical objects that contain embedded technology configured to provide some degree of computing intelligence. These smart devices may communicate and sense or interact with their internal states or the external environment. The "Internet of Things" ("IoT") refers to a network of these smart devices ("IoT devices"). IoT devices are deployed for various applications, such as health monitoring applications or traffic control applications, where security and reliability of device identification, registration, and software installation is critical.

According to currently-available technology, secure device identification and software update is driven by use of digital certificates (e.g., X.509 certificates) and Public Key Infrastructure (PKI). Centralized identity management mechanisms, such as PKI, use a centralized trust anchor, a certificate authority (CA), for attesting to the validity of keying material. As the deployment of connected IoT devices are exponentially increasing, the use of centralized identity management mechanisms can lead to various technology challenges including scalability, performance, interoperability, security, and privacy, for example.

SUMMARY

This disclosure describes techniques for securing device registration and software updates using Decentralized Identifiers (DIDs). DIDs are based on a distributed ledger technology such as blockchain (e.g., the technology underlying various cryptocurrencies, such as Ethereum and Bitcoin). In some aspects, the techniques described in this disclosure use DIDs for attesting the validity of keying material rather than using a centralized trust anchor. Using DIDs, devices register verifiable credentials that can be verified with public keys controlled through the DID. A verifiable credential is a document containing information about a subject which can be cryptographically verified. Verifiable credentials provide the ability to selectively disclose information, thereby protecting privacy. The techniques described in this disclosure leverage DIDs and verifiable credentials to securely register devices in, for example, large-scale deployments and to securely install firmware or other software on those devices.

In one example implementation, a device and data store registers their DIDs with a registrar, which creates an immutable record within the distributed ledger. The device registers with the data store and receives a verifiable credential containing a DID of the data store. When a software publisher releases a software update that is ready for access, the software publisher registers a verifiable credential for the software update to the data store. The device may periodically send a request to the data store to determine whether a software update is available. To send the request, the device first resolves the DID of the data store to obtain an associated DID document through a resolver. Using the DID document of the data store, the device determines a service endpoint (e.g., a host device of the data store) and sends a request to the service endpoint, the request including a verifiable credential for the device and the DID of the device, which may be included in the verifiable credential. The data store receives the request and resolves the DID of the device to an associated DID document of the device through the resolver. The data store verifies the request from the device (e.g., using a key from the DID document of the device), looks up a verifiable credential for the software update and sends a message including the verifiable credential for the software update to the device, which may verify the message. The device determines whether the verifiable credential for the software update is valid, and if so, the device resolves a DID of the software publisher (e.g., determined from the verifiable credential for the software update) to an associated DID document of the software publisher and uses keys in the DID document of the software publisher to verify the verifiable credential for the software update. If the software update verifiable credentials are verified, the device obtains the software update and verifies the one or more software update files against corresponding file verifiers within the verifiable credentials for the software update. In response to verifying the one or more software update files, the device may then install the software update files to install the software update. If any of the verification steps fails, on the other hand, the device may output an error indicating a verification failure.

In one example, the techniques in this disclosure describe a method comprising: sending, by a device and to a data store, a request for a software update published by a software publisher, wherein the request includes a verifiable credential for the device, and wherein the verifiable credential for the device includes a Decentralized Identifier (DID) of the device; receiving, by the device and from the data store, a verifiable credential for the software update, wherein the verifiable credential for the software update includes a DID of the software publisher; determining, by the device, whether the software update is newer than software on the device; obtaining, by the device, the software update from the software publisher from a location specified by the verifiable credential for the software update; verifying, by the device, the software update based on the verifiable credential for the software update; and in response to verifying the software update based on the verifiable credential for the software update, installing, by the device, the software update.

In another example, the techniques in this disclosure describe a method comprising: receiving, by a data store and from a software publisher, a verifiable credential for a software update published by the software publisher; receiving, by the data store and from a device, a request for a software update, wherein the request for the software update includes a verifiable credential for the device, and wherein the verifiable credential for the device includes a Decentralized Identifier (DID) of the device and; verifying, by the data store, the request based on the DID of the device; and in response to verifying the request, returning, by the data store and to the device, the verifiable credential for the software update.

In another example, the techniques in this disclosure describe a device comprising: a memory; and processing circuitry in communication with the memory, the processing circuitry being configured to: send, to a data store, a request for a software update published by a software publisher, wherein the request includes a verifiable credential for the device, and wherein the verifiable credential for the device includes a Decentralized Identifier (DID) of the device; receive, from the data store, a verifiable credential for the software update, wherein the verifiable credential for the software update includes a DID of the software publisher; determine whether the software update is newer than software on the device; obtain the software update from the software publisher from a location specified by the verifiable credential for the software update; verify the software update based on the verifiable credential for the software update; and in response to verifying the software update based on the verifiable credential for the software update, install the software update.

The techniques described in this disclosure may provide one or more advantages in the form of technical improvements over existing centralized identity management mechanisms. By using DIDs and verifiable credentials, the techniques of this disclosure may enable devices to securely download and verify a software update prior to installation and on a periodic basis, while providing more scalability with less errors than existing centralized identity management mechanisms, such as Public Key Infrastructure (PKI).

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 4 depicts an example command-line interface output showing steps of a successful software update performed by a device, in accordance with one or more techniques described in this disclosure.

Like reference characters denotes like elements throughout the text and figures.

DETAILED DESCRIPTION

With the decreasing costs of chips and other computing hardware, the number of devices in connected environments is steadily increasing. Moreover, the integration of chips and communication interface hardware has created an ever-broadening choice of so called "smart" devices, giving rise to the "Internet of Things" or "IoT." With the numerous benefits of the IoT also comes various potential challenges. For instance, various security concerns and challenges arise from the rapid, and potentially exponential, increase in smart devices joining the IoT.

One such security concern is associated with securing IoT devices for registration and securely providing software updates to the IoT devices. To secure IoT device registration and software updates, existing systems use currently-available technology, such as digital certificates (e.g., X.509 public key certificates) and Public Key Infrastructure (PKI). However, digital certificates do not have unlimited lifetimes and may lead to device registration and/or software installation issues. For example, software publishers must renew their digital certificates periodically. In certain instances, if digital certificates are not renewed (e.g., by revocation or expiration), the installation of a software distribution or an existing, installed software system can fail. Because digital certificates and PKI are centralized in nature, these technologies require the use of a centralized third-party trust anchor, e.g., Certificate Authority (CA), for attesting to the validity of keying material. As IoT deployments scale, a centralized third-party trust anchor is prone to additional errors with device registration and software updates. For example, as IoT deployments scale, a centralized third-party trust anchor may be prone to mistakenly revoke digital certificates.

This disclosure describes techniques for securing device registration and software updates using decentralized identifiers rather than using a centralized third-party trust anchor. In some examples, this disclosure is directed to the use of Decentralized Identifiers (DIDs) based on distributed ledger technology to secure device registration and software updates. While the technical improvements provided by this disclosure are not limited to IoT environments, IoT environments represent one illustrative example in which the system configurations of this disclosure may be particularly beneficial.

Figure 1:
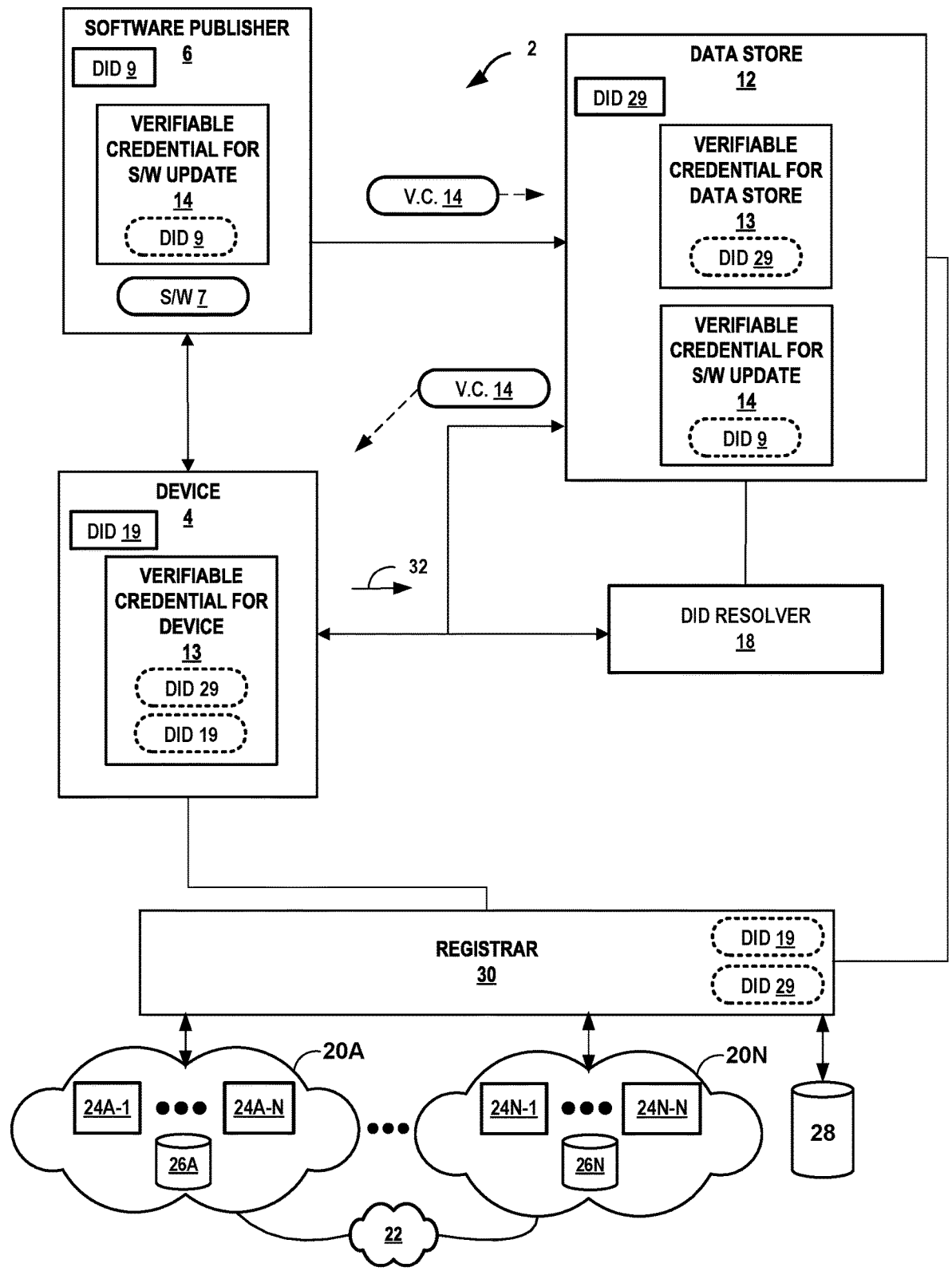
FIG. 1 is a conceptual diagram illustrating a system that provides secure device registration and software update, in accordance with one or more aspects of the present disclosure.

FIG. 1 is a conceptual diagram illustrating a system 2 that provides secure device registration and software update using Decentralized Identifiers (DIDs), in accordance with one or more aspects of the present disclosure. In the example of FIG. 1, system 2 includes multiple consensus networks, including consensus network 20A through consensus network 20N (collectively, "consensus networks 20") that each includes one or more distributed ledgers 26. Consensus networks 20 are communicatively connected via network 22. Network 22 may be part of a public network, such as the Internet. Each of consensus networks 20 includes a plurality of nodes. For instance, consensus network 20A includes nodes 24A-1 through 24A-N (collectively "nodes 24A"), which may represent any number of nodes. Similarly, consensus network 20N includes nodes 24N-1 through node 24N-N (collectively "nodes 24N"), which, again, may represent any number of nodes. Each of nodes 24A-1 through 24A-N (shown within consensus network 20A) and each of nodes 24N-1 through 24N-N (shown within consensus network 20B) may be implemented as any suitable computing system, such as one or more server computers, workstations, mainframes, appliances, cloud computing systems, and/or other computing systems that may be capable of performing operations and/or functions described in accordance with one or more aspects of the present disclosure. One or more of nodes 24A and/or nodes 24N may, in some examples, represent a cloud computing system, server farm, and/or server cluster (or portion thereof) that provides services to client devices and other devices or systems. In other examples, nodes 24A and nodes 24N may represent or be implemented through one or more virtualized compute instances (e.g., virtual machines, containers) of a data center, cloud computing system, server farm, and/or server cluster. For instance, any or all of nodes 24A or nodes 24N may be implemented as Ethereum (or other blockchain) virtual machines.

As described above, each of consensus networks 20 implements one or more distributed ledgers. In the example shown, consensus network 20A includes distributed ledger 26A that implements a blockchain (e.g., the technology underlying various cryptocurrencies, such as Ethereum, Sovrin, and Bitcoin). Distributed ledger 26A may be implemented as a data store included in multiple (or all) nodes 24A within consensus network 20A. Consensus networks 20 (that is, the remainder of the consensus networks through consensus network 20N) may be implemented in a similar manner, so that each of consensus networks 20 includes one or more distributed ledgers 26 (e.g., consensus network 20N includes distributed ledger 26N). In general, each node within a respective consensus network 20 (or a significant fraction of the nodes) includes a copy (or at least a partial copy) of the distributed ledgers maintained by the respective consensus network 20.

Each of distributed ledgers 26 (i.e., included within each of consensus networks 20) may be shared transactional databases or data stores that include a plurality of blocks, each block (other than the root) referencing at least one block created at an earlier time, each block bundling one or more transactions registered within distributed legers 26, and each block cryptographically secured. Each of consensus networks 20 may receive transactions from transaction senders (e.g., computing devices external or internal to each of consensus networks 20) that invoke functionality of distributed ledgers 26 to modify a given distributed ledger 26 stored within a consensus network. Each of consensus networks 20 uses the distributed ledger 26 stored within the consensus network for verification. Each block of a distributed ledger typically contains a hash pointer as a link to a previous block, a timestamp, and the transaction data for the transactions. By design, distributed ledgers 26 are inherently resistant to modification of previously-stored transaction data. Functionally, each of distributed ledgers 26 serves as a ledger, distributed across many nodes of a consensus network, that can record transactions between parties efficiently and in a verifiable and permanent way.

Nodes 24 of each of consensus networks 20 implement one or more distributed ledgers 26. Each of consensus networks 20 may be a peer-to-peer network that manages one or more distributed ledgers 26 by collectively adhering to a consensus protocol and/or performing operations corresponding to various device identification-related or network-compliance-related rules set. Nodes 24 adhere to the protocol and/or rules for validating new blocks. Once recorded, the data in any given block of distributed ledgers 26 cannot be altered retroactively without the alteration of all subsequent blocks and a collusion of at least some (e.g., typically a majority) of nodes 24 of the particular consensus network. For instance, with reference to consensus network 20A, the data in a block within distributed ledger 26 cannot be altered retroactively without also altering all subsequent blocks without agreement of a majority of nodes 24A of consensus network 20A.

One or more of consensus networks 20 may, for instance, represent an Ethereum network, Sovrin network, Bitcoin network, or other blockchain network. Additional information regarding distributed ledgers is described in U.S. patent application Ser. No. 16/453,606, entitled "SMART CONTRACT INTERPRETER," filed Jun. 26, 2019, the entire contents of which is incorporated by reference herein.

Alternatively, or additionally, system 2 includes a decentralized, content-addressable data store 28 ("decentralized data store 28"), such as IPFS. Decentralized data store 28 is a decentralized file system in which operators hold a portion of the overall data. Additional examples of a decentralized, content-addressable data store, such as IPFS, the entire contents of which is incorporated by reference herein.

Device 4 may be one of a variety of smart devices, referred to generally as IoT devices, such as personal computers (e.g., desktop, laptop, netbook computers), handheld devices (e.g., tablet computers, smartphones), wearables (smartwatches, smart glasses, virtual reality headsets, augmented reality headsets), smart home devices (e.g., smart thermostats and particulate matter detectors, cameras, motion sensors, televisions), sensors (RFID readers), and so on.

In some examples, device 4 may be deployed for certain applications, such as applications for human health and safety (e.g., continuous heart rate monitoring). Any misconfiguration or malware installation for such applications may endanger lives. As such, these applications require secure and reliable device identification, registration, and software installation. While only a single device 4 with corresponding verifiable credential 13 and DID 19 is shown in FIG. 1, the techniques are applicable to multiple devices which, in the IoT context, can be numerous. Each such device has a corresponding, unique verifiable credential and unique DID.

Conventionally, IoT devices use X.509 certificates and Public Key Infrastructure (PKI) to authenticate device identification and software updates. An X.509 certificate may include a hash of a software publisher's organization name combined with a hash of the software image. This value is bound into the certificate, and the certificate is then signed by the software publisher and the third-party trust anchor. The certificate can be used for verifying a downloaded software distribution and pre-boot verification, ensuring that the software has not been tampered with while the software is installed. Code signing certificates are distributed with the software installation, and the software publisher may be the same as or different from the manufacturer of the device. Code signing certificates are scalable for small to medium sized IoT deployments.

Because the use of X.509 certificates and PKI are dependent on a third-party trust anchor, e.g., Certificate Authority (CA), a variety of issues can arise with larger deployments. These issues may include certificate expiration and certificate revocation. For example, public key certificates have limited lifetimes and software publishers must renew their certificates periodically. In some cases, the software publisher may neglect to renew their certificates, which causes the installation of a software distribution to fail or function improperly. In some cases, the Certificate Authority may revoke a software publisher's certificate by placing the certificate on a certificate revocation list (CRL) without informing the software publisher about the revocation. In these cases, users may be unable to access the applications and the software publisher is left uninformed of the issue. In other cases, if a certificate expires or is revoked on an IoT device that is installed in a place where physical access is difficult, it may be difficult to replace the certificate.

In accordance with the techniques described in this disclosure, Decentralized Identifiers (DIDs) and verifiable credentials are used to securely register device 4 in a deployment and to securely install firmware or other software on device 4. DIDs are decentralized, unique identifiers that are cryptographically verifiable and do not require a centralized third-party trust anchor. Using DIDs, device 4 can register credentials that can be verified with public keys controlled through the DID, called verifiable claims or verifiable credentials.

In some examples, a DID may have a Universal Resource Name (URN) format as shown below:

did:method:123abc

The initial "did" field identifies the URN as belonging to a decentralized identifier scheme. The "method" field identifies the DID method used to define the DID and to identify a DID document type (as further described below). For example, DID methods may include Sovrin (e.g., "did:sov:"), Bitcoin (e.g., "did:btcr"), InterPlanetary File System (IPFS) (e.g., "did:ipid:"), and other consensus networks and/or decentralized, content-addressable data stores. Additional examples of DID methods are further described in Draft Community Group Report 10 Jun. 2019, Credentials Community Group (W3C), the entire contents of which is incorporated by reference herein. The "123abc" is the actual unique identifier associated with one or more devices 4. In some examples, a DID is typically generated by computing a hash of a public key or a hash of a DID document associated with the DID.

By way of a DID resolver 18, a DID may be used to obtain a DID document that contains information for cryptographically verifying the identity of the entity (e.g., device 4, data store 12) that registered the DID and establishing secure communication with the entities. In the example of FIG. 1, DID documents may be stored within distributed ledgers 26 and/or decentralized data store 28. For example, DID documents may be stored within distributed ledgers 26 based on a DID method (e.g., Sovrin). DID resolver 18 may resolve a DID to an associated DID document stored in distributed ledgers 26 or decentralized data store 28. DID resolver 18 may include plug-ins (e.g., DID drivers) for one or more of the DID methods as described above to lookup and resolve DIDs to associated DID documents stored in distributed ledgers 26.

In some examples, a DID document is a JavaScript Object Notation for Linked Data (JSON-LD) document. A DID document includes the DID to which the DID document applies, called the "DID subject." In some examples, the DID document may include an array public key records including public keys used for authenticating, authorizing updates to the DID document, or establishing a secure communication with service endpoints. The DID document may also include an array of authentication methods to use when communicating with the DID subject, and one or more proof methods to establish the authenticity of the DID document (e.g., that the DID document has not been tampered with). Additional examples of DID and DID document are further described in "Decentralized Identifiers (DIDs) v0.13," Credentials Community Group (W3C), the entire contents of which is incorporated by reference herein. Further examples are also described in U.S. Provisional Patent Application No. 62/908,976, filed Oct. 1, 2019 and U.S. patent application Ser. No. 17/019,001 entitled "Virtualized Network Functions Verification Using Decentralized Identifiers," filed Sep. 11, 2020, the entire contents of both of which are incorporated by reference herein.

Using DIDs, device 4 may register credentials that can be verified with verifiable credentials. A verifiable credential is used to extend the ability to assert a credential on-line in a way that allows the credential to be cryptographically verified, preserves privacy by only allowing information related to the claim to be exposed, and is machine-readable. A verifiable credential may be a JSON-LD formatted document containing information about a DID subject (e.g., the DID to which a DID document applies) which can be cryptographically verified. An example of a verifiable credential is shown below:

```
{
  "@context": [
    "https://www.w3.org/2018/credentials/v1",
    "https://www.w3.org/2018/credentials/examples/v1" ],
  "id": "http://examples.com/credentials/3732",
  "issuer": "https://examples.com/issuers/14",
  "type": ["VerifiableCredential",
    "SoftwareUpdateCredential" ],
  "credentialSubject": {
    "id": "did:method:abc123",
    "version": "2.0.0"
    "imageURL":
       "https://examples.com/files/update2.0.0.0.img",
    "imageSignature": "335 . . . e9e",
    "type": "EcdsaKoblitzSignature2016",
    "publicKeyHex": "032 . . . 849"
  }
}
```

This example of a verifiable credential includes a "@context" property, the value of which is an array of links to one or more documents that establish the context for systems to exchange information. The "id" property contains an identifier for the verifiable credential document. The identifier may specify an object, such as a person, product, or organization. The "id" property may be a Uniform Resource Identifier (URI). A "version" property may specify the version identifier for a version of the software. An "issuer" property may specify a link to the issuer that issues the verifiable credential. The "type" property specifies one or more verifiable credential types. The "type" property may be one or more URIs or mapped to one or more URIs. The "type" property may also specify one or more narrow types, such as "SoftwareUpdateCredential," such that a verifier may determine the contents of an associated object based on the encapsulating object type. The "credentialSubject" property specifies claims (otherwise referred to herein as "file verifiers" or "image verifiers") about the software update. For example, the "credentialSubject" property is a JSON subobject which has an "id" property, the value of which is an unambiguous identifier for the DID subject, e.g., a DID (e.g., did:method:abc123). The rest of the sub-object contains properties having values that assert one or more claims about the DID subject. In the above example, the file verifiers of the verifiable credential asserts that the DID subject is a software update with a version 2.0.0, a URL to the software file/image. Additional information included in the "credentialSubject" property may include an issuance date property and contain a proof section for verifying the verifiable credential. In the example above, the file verifiers of the "credentialSubject" property may also include an "imageSignature" property specifying the digital signature of a software image that is a corresponding one of the files of the software update, a "type" property specifying the type of digital signature, and "publicKeyHex" property that specifies the public key. Additional examples of verifiable credentials are described in "Verifiable Credentials Data Model 1.0," the entire contents of which is incorporated by reference herein.

Verifiable credentials can be stored in a data store, e.g., data store 12, or a trust issuer, that safely and securely stores semantic data objects. As one example, data store 12 may represent a Decentralized Identity Foundation (DIF) Identity Hub as described in W3C, "DIF Identity Hubs," the entire contents of which is incorporated by reference herein.

A DID subject that stores its verifiable credentials in data store 12 may include a service endpoint in the DID document. For example, a DID document may include one or more service endpoints that represent (and may provide) any type of service for the entity that the DID document is about (e.g., the DID subject). In this example, services may include verifiable claim repository services, e.g., as provided by data store 12. An example of the service endpoint for the verifiable credentials is shown below:

"service": [{
"type": "IdentityHub",
"publicKey": "did:abc123*key-1",
"serviceEndpoint":}
"@context":
"schema.identity.foundation/hub",
"@type": "HostServiceEndpoint",
"locations": [
"https://hub1.bar.com/.identity",
"https://hub2.bar.com/example/.identity
]
}
}]

In this example, the service endpoint specifies a "type" of service endpoint, which is the data store 12, e.g., "IdentityHub." The "publicKey" property may be formulated as a fragment Uniform Resource Identifier (URI) that specifies the DID as the URI with a fragment identifier (e.g., "#key-1"). The "serviceEndpoint" property specifies the verifiable credential document for the service (e.g., "@context"), a "@type" property that specifies the type of service endpoint (e.g., "HostServiceEndpoint"), and a location to the service endpoint, such as one or more URLs that resolve to one or more host devices that host the service. The service endpoint may include additional properties, such as the cost of a transaction, as a collection of JSON object formatted properties after the service endpoint. In this example, the service endpoint is a host of the addressable data store (e.g., "IdentityHub"), indicated by the "HostServiceEndpoint" value of the "@ type" property.

In some examples, software publisher 6 may generate DID 19 of device 4. Software publisher 6 may be a manufacturer of device 4, software provider for the manufacturer of device 4, or other entity that publishes software to be installed to device 4. In some examples, DID 19 is generated when device 4 is initially provisioned on a network (e.g., using an application key generated from a SIM card application key hierarchy or similar). Device 4 may register DID 19 with registrar 30, which is used to register device 4 to install firmware/software to device 4. Data store 12 may register DID 29 with registrar 30.

Registrar 30 may use a Sidetree protocol or other protocols to store DID information on distributed ledger 26. For example, registrar 30 may write a hash of the operations (e.g., create, read, update, delete (CRUD)) performed on the DID document to a distributed ledger 26, thereby creating an immutable record of those operations. Additional examples of the Sidetree protocol are described in D. Buchner, "Sidetree Entity Protocol," "The Sidetree Protocol:
Scalable DPKI for Decentralized Identity," the entire contents of both of which are incorporated by reference herein. The operation records and the DID document are stored in a decentralized content addressable store (e.g., IPFS), for example.

Device 4 may register DID 19 with the data store 12. In response, data store 12 provides device 4 with a verifiable credential for data store 12, e.g., verifiable credential 13, attesting to the legitimacy of device 4 to access data store 12 and containing DID 29 of data store 12. Device 4 may store the verifiable credential 13 for data store 12 and DID 29 of data store 12.

When software publisher 6 releases a software update 7 (illustrated in FIG. 1 as "s/w 7") that is ready for access, software publisher 6 publishes a verifiable credential for software update 7, e.g., verifiable credential 14, to data store 12. Device 4 may periodically send a request to data store 12 to determine whether a software update is available. For example, when device 4 is ready to update its software with a software update, device 4 executes the following process. (1) Device 4 resolves DID 29 of data store 12 (that was provided by data store 12 when device 4 registered with data store 12) to an associated DID document of data store 12 through DID resolver 18. (2) Using the DID document of data store 12, device 4 determines a service endpoint (e.g., host device of data store 12) and sends a request 32 to data store 12 for a verifiable credential for the latest software update. For example, device 4 determines the service endpoint using the "HostServiceEndpoint" property of the DID document of data store 12 and sends an HTTP POST request including a verifiable credential for device 4, e.g., verifiable credential 13, as the body of request 32 and containing DID 19 of device 4. (3) Data store 12 receives request 32 and resolves DID 19 of device 4 to an associated DID document of device 4 through DID resolver 18. (4) Data store 12 receives the DID document of device 4 (or a URL to the DID document of device 4) from DID resolver 18, verifies request 32 (e.g., checking whether the signature of request 32 is valid and checking the signature of the DID document of device 4 is valid) using a key from the DID document of device 4, and if verified, looks up a verifiable credential for the latest software update, e.g., verifiable credential 14. (5) Data store 12 returns verifiable credential 14 for the software update to device 4. Verifiable credential 14 may include a URL (e.g., "imageURL") to a location to obtain the new software file/image, and one or more file verifiers (e.g., "imageSignature", "type", "publicKeyHex"). (6) Device 4 verifies verifiable credential 14 returned from data store 12 is valid. For example, device 4 determines whether the signature from the verifiable credential 14 and the signature from the DID document of device 4 are valid and using the same public key, and if so, (7) device 4 resolves DID 9 of software publisher 6 (e.g., determined from verifiable credential 14 for the software update) to an associated DID document of software publisher 6. (8) Device 4 verifies verifiable credential 14 for the software update based on the keys in the DID document of the software publisher. (9) Device 4 downloads the software file/image from a URL included in verifiable credential 14 for the software update (e.g., "imageURL"), checks the software file/image against the file verifiers (e.g., "imageSignature", "type", "publicKeyHex")), and, if verified, installs the software file/image.

The system of FIG. 1 is merely an example. The techniques and systems of this present disclosure may be performed with many more of such systems, components, devices, modules, and/or other items, and collective references to such systems, components, devices, modules, and/or other items may represent any number of such systems, components, devices, modules, and/or other items.

The techniques of this disclosure may provide one or more advantages in the form of technical improvements over existing centralized identity management mechanisms. For example, by using DIDs and verifiable credentials to securely register devices and to securely install firmware or other software on the devices, the techniques of this disclosure may enable devices to securely download and verify a software distribution prior to installation and on a periodic basis without relying on a centralized certificate authority. In this way, the systems and techniques of this disclosure provide more scalability with fewer errors than existing centralized identity management mechanisms, such as PKI.

Figure 2:
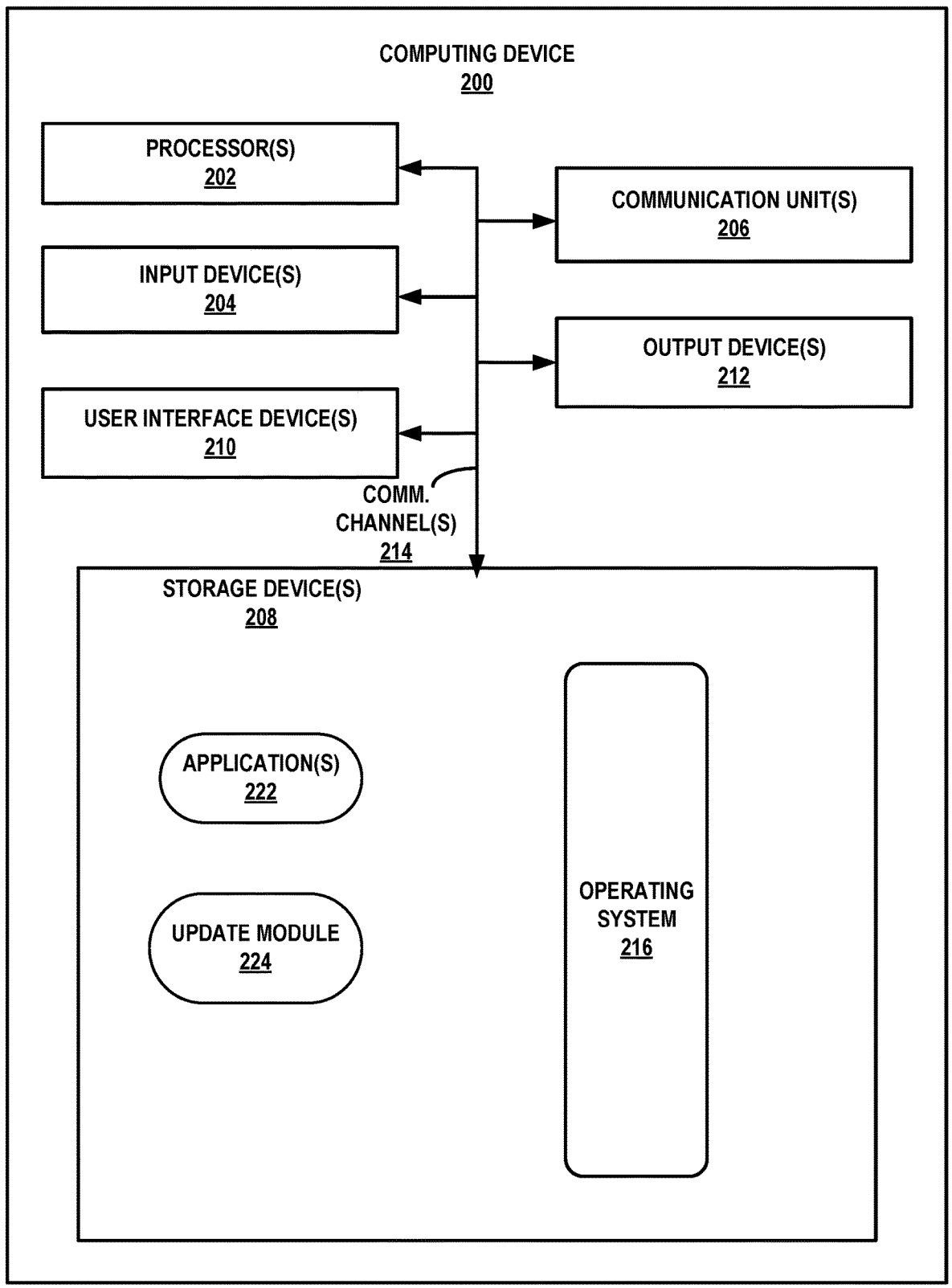
FIG. 2 is a block diagram illustrating an example computing device that operates in accordance with one or more techniques described in this disclosure.

FIG. 2 is a block diagram illustrating an example computing device 200 that operates in accordance with one or more techniques described in this disclosure. Computing device 200 represents a non-limiting example of any computing device of FIG. 1, such as device 4, data store 12, software publisher 6, or any other device.

Computing device 200 is described herein as an implementation of device 4 of FIG. 1, which is a computing device that includes update module 224 that uses Decentralized Identifiers (DIDs) and verifiable credentials to securely register computing device 200 in a deployment and to securely install firmware or other software on computing device 200.

Computing device 200 includes one or more processors 202 for executing any one or more of application(s) 222, operating system 216, update module 224, and/or other functionalities described herein. Although shown in FIG. 2 as a stand-alone computing device 200 for purposes of example, a computing device may be any component or system that includes one or more processors or other suitable computing environment for executing software instructions and, for example, need not necessarily include one or more elements shown in FIG. 2 (e.g., communication units 206; and in some examples, components such as storage device (s) 208 may not be co-located or in the same chassis as other components).

Computing device 200 includes one or more processors 202, one or more input devices 204, one or more communication units 206, one or more output devices 212, one or more storage devices 208, and one or more user interface (UI) device(s) 210. Application(s) 222, operating system 216, and update module 224 are stored to storage device(s) 208, and executable by components of computing device 200, such as by processor(s) 202. Each of components 202, 204, 206, 208, 210, and 212 are coupled (physically, communicatively, and/or operatively) for inter-component communications. In some examples, communication channels 214 may include a system bus, a network connection, an inter-process communication data structure, or any other structure suitable for communicating data in various formats, such as electrical signals. As one example, components 202, 204, 206, 208, 210, and 212 may be coupled by one or more communication channels 214.

Processors 202, in one example, are configured to implement functionality and/or process instructions for execution within computing device 200. For example, processor(s) 202 may be capable of processing instructions stored in storage device 208. Examples of processor(s) 202 may include, any one or more of a microprocessor, a controller, a digital signal processor (DSP), an application specific integrated circuit (ASIC), a field-programmable gate array (FPGA), processing circuitry of various types including fixed function circuitry and/or programmable processing circuitry, or equivalent discrete logic circuitry or integrated logic circuitry.

One or more storage devices 208 may be configured to store information within computing device 400 during operation. Storage device(s) 208, in some examples, are described as a computer-readable storage medium. In some examples, storage device(s) 208 include a temporary memory, meaning that a primary purpose of storage device (s) 208 is not long-term storage. Storage device(s) 208, in some examples, incorporate volatile memory, meaning that these portions of storage device(s) 208 do not maintain stored contents when computing device 400 is turned off. Examples of volatile memories include random access memories (RAM), dynamic random access memories (DRAM), static random access memories (SRAM), and other forms of volatile memories known in the art. In some examples, storage device(s) 208 are used to store program instructions for execution by processor(s) 202. Storage device(s) 208, in one example, may be used by software or applications (e.g., application(s) 222) running on computing device 200 to temporarily store information during program execution.

Storage device(s) 208, in some examples, also include one or more computer-readable storage media. Storage device(s) 208 may be configured to store larger amounts of information than volatile memory. Storage devices(s) 208 may further be configured for long-term storage of information. In some examples, storage device(s) 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication units 206. Computing device 200, in one example, utilizes communication units 206 to communicate with external devices via one or more networks, such as one or more wired/wireless/mobile networks. Communication unit(s) 206 may include a network interface card, such as an Ethernet card, an optical transceiver, a radio frequency transceiver, or any other type of device that can send and receive information. Other examples of such network interfaces may include 3G® and WiFi® radios. In some examples, computing device 200 uses communication unit(s) 206 to communicate with an external device.

Computing device 200, in one example, also includes one or more user interface devices 210. User interface device(s) 210, in some examples, are configured to receive input from a user through tactile, audio, or video feedback. Examples of user interface devices(s) 210 include a presence-sensitive display, a mouse, a keyboard, a voice responsive system, video camera, microphone, or any other type of device for detecting a command from a user. In some examples, a presence-sensitive display includes a touch-sensitive screen. In some examples, a user such as an employee of the co-location facility provider may enter configuration data defining metrics for characterizing services.

One or more output devices 212 may also be included in computing device 200. Output device 212, in some examples, is configured to provide output to a user using tactile, audio, or video stimuli. Output device 212, in one example, includes a presence-sensitive display, a sound card, a video graphics adapter card, or any other type of device for converting a signal into an appropriate form understandable to humans or machines. Additional examples of output device 212 include a speaker (e.g., one or more loudspeakers or headphones), a cathode ray tube (CRT) monitor, a liquid crystal display (LCD), a light emitting diode (LED) display, or any other type of device that can generate output intelligible to a user.

Computing device 200 may execute operating system 216. Operating system 216, in some examples, controls the operation of components of computing device 200. For example, operating system 216, in one example, facilitates the communication of one or more applications 222 with processors 202, communication unit 206, storage device 208, input device 204, user interface devices 210, and output device 212. Applications 222 may also include program instructions and/or data that are executable by computing device 200.

Update module 224 may use Decentralized Identifiers (DIDs) and verifiable credentials to securely register computing device 200 in a deployment and to securely install firmware or other software on computing device 200. For example, update module 224 may cause communication unit(s) 206 to communicate with other devices of the network system, e.g., DID resolver 18, to resolve DIDs to associated DID documents. For example, computing device 200 may request for a verifiable credential for data store 12, including DID 29 of data store 12, and store DID 29 of data store 12 in storage device(s) 208. When computing device 200 is ready to update its software, update module 224 may cause communication unit(s) 206 to communicate with DID resolver 18 to resolve DID 29 of data store 12 stored in memory of storage device(s) 208. Update module 224 may obtain a DID document of data store 12 and determine a service endpoint from the DID document. Update module 224 may cause communication unit(s) 206 to communicate with the service endpoint (e.g., data store 12) to request for a verifiable credential for a software update from a software publisher. Update module 224 may receive a verifiable credential for a software update from data store 12. Update module 224 determines whether the software distribution is newer than the software currently on computing device 200, and if so, update module 224 resolves a DID of the software publisher to its associated DID document. Update module 224 may verify the verifiable credential for the software update by determining if the signatures of the DID document and the verifiable credential are valid using the keys in the DID document of the software publisher. If verified, update module 224 may cause communication unit(s) 206 to communicate with a device storing the software file/image (e.g., via a URL) to obtain the software update. Update module 224 further checks the software file/image against file verifiers (e.g., "imageSignature", "type", "publicKeyHex")), and, if verified, installs the software file/image.

In some examples, computing device 200 may represent an implementation of data store 12 of FIG. 1, which is a computing device that includes update module 224 that uses Decentralized Identifiers (DIDs) and verifiable credentials to securely register computing device 200 in a deployment and to securely install firmware or other software on computing device 200. In these examples, computing device 200 may use communication unit(s) 206 to communicate with software publisher 6 to receive verifiable credentials for a software update (e.g., verifiable credential 14 of FIG. 1). Computing device 200 may also use communication unit(s) 206 to communicate with device 4 to receive requests for a software update. In the event computing device 200 receives a request for a software update from device 4, update module 224 may cause communication unit(s) 206 to communicate with DID resolver 18 to resolve DID 19 received (e.g., in a request) from device 4. Update module 224 may obtain a DID document of device 4 and verify the request from device 4 using, for example, a key from the DID document. If verified, update module 224 may look up a verifiable credential for the software update and cause communication unit(s) 206 to communicate with device 4 to send the verifiable credential for a software update to device 4.

In some examples, functions performed by update module 224 could be performed by software or by a hardware device executing software. In other examples, functions performed by update module 224 may be implemented primarily or partially through hardware, such as by processing circuitry of computing device 200.

Figure 3:
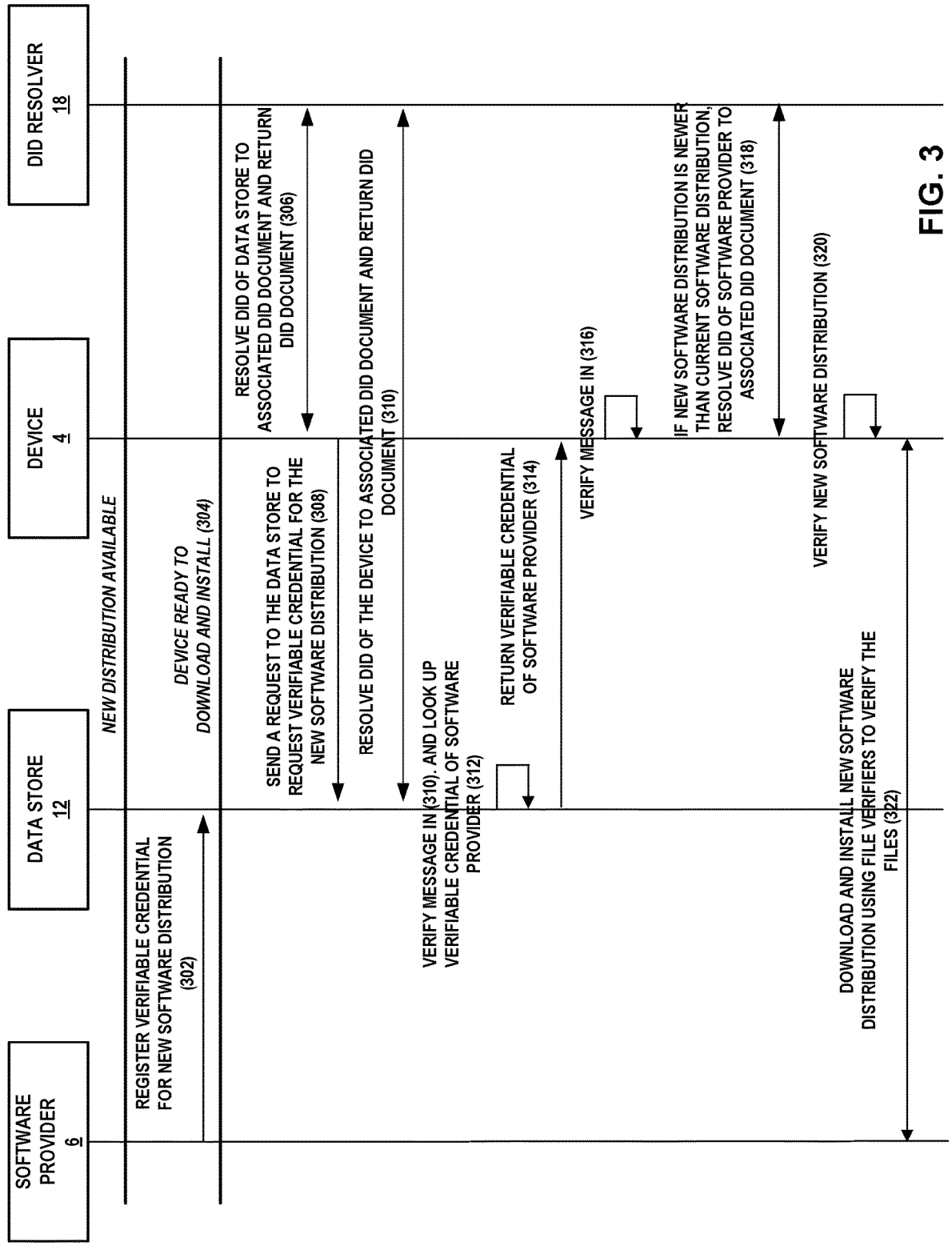
FIG. 3 is a flowchart illustrating an example process that a device of the system of FIG. 1 may perform for secure device registration and software update using Decentralized Identifiers (DIDs), in accordance with one or more techniques described in this disclosure.

FIG. 3 is a flowchart illustrating an example process 300 that a device of system 2 of FIG. 1 may perform for secure device registration and software update using Decentralized Identifiers (DIDs), in accordance with one or more techniques described in this disclosure. Process 300 is described herein as being performed by processing circuitry of a device. The processing circuitry of the device may include, be, or be part of, an ASIC, fixed function circuitry, programmable processing circuitry, any combinations thereof, or other equivalent discrete logic circuitry or integrated circuitry. While process 300 may be performed by a variety of the devices of this disclosure (devices and/or IoT devices), FIG. 3 is described as being performed by any device of network 2, as a non-limiting example.

In some examples, software publisher 6 (or a device manufacturer of device 4) may generate DID 19 of device 4 at the factory. In some examples, DID 19 is generated when device 4 is initially provisioned on a network (e.g., using an application key generated from a SIM card application key hierarchy or similar). Devices 4 may register DID 19 with registrar 30, which is used to register devices 4 and to install firmware/software to devices 4. Similarly, data store 12 may register DID 29 with registrar 30.

Device 4 may request for a verifiable credential for data store 12. In response, data store 12 provides device 4 with a verifiable credential for data store 12, e.g., verifiable credential 13, attesting to the legitimacy of device 4 to access data store 12 and containing DID 29 of data store 12.

When a software update is available, software publisher 6 provides a verifiable credential 14 of the software update to data store 12. For example, software publisher 6 registers the verifiable credential 14 for the software update with data store 12 (302). Device 4 may periodically request for updates to firmware/software. For example, when device 4 is ready to update its software with the software update (304), device 4 resolves DID 29 of data store 12 (that was received from data store 12) to an associated DID document through DID resolver 18 (306). Using the DID document of data store 12, device 4 determines a service endpoint (e.g., host device of data store 12) and requests for a verifiable credential for the software update from data store 12 (308). For example, data store 12 determines the service endpoint using the "HostServiceEndpoint" property of the DID document and sends an HTTP POST request including verifiable credential 13 of device 4 as the body of the request and DID 19 of device 4.

Data store 12 receives the request and resolves DID 19 of device 4 to an associated DID document through DID resolver 18 (310). Data store 12 receives a DID document of device 4 from DID resolver 18, verifies the request from device 4 using a key from the DID document of device 4, and if verified, looks up a verifiable credential for the software update, e.g., verifiable credential 14 (312). Data store 12 may verify the request using public key cryptography by checking that the signature on the request message is valid and verifying that the DID belongs to the same entity that signed the message, e.g., by checking the signature on the corresponding DID document can be validated by the same public key. Data store 12 returns verifiable credential 14 of the software update to device 4 (314). For example, data store 12 may return verifiable credential 14 including a URL (e.g., "imageURL") to a location to obtain the new software file/image, and one or more file verifiers (e.g., "imageSignature", "type", "publicKeyHex").

Device 4 verifies a verifiable credential 14 returned from data store 12 using a key from verifiable credential 14 (e.g., "publicKeyHex") (316). For example, device 4 may verify the message that includes verifiable credential 14 of the software provider using a process similar to the request message verification by data store 12, above. Device 4 determines whether the software update is newer than the current software installed on the device (e.g., a newer version of the software), and if so, device 4 resolves DID 9 of software publisher 6 (e.g., determined from verifiable credential 14 of the software update) to an associated DID document of software publisher 6 and uses the DID document of software publisher 6 to verify verifiable credential 14 of the software update (318). Device 4 uses the keys in the DID document of software publisher 6 to verify the verifier credential 14 of the software update (320). If the verifiable credential 14 for the software update is verified, device 4 obtains the software update and verifies the one or more software update files against corresponding file verifiers within the software update verifiable credentials. For example, device 4 downloads the software file/image from a URL included in the verifiable credential for the software update (e.g., "imageURL"), checks the software file/image against the file verifiers (e.g., "imageSignature", "type", "publicKeyHex")). In response to verifying the one or more software update files, device 4 downloads and installs the software update (322).

FIG. 4 depicts an example command-line interface output showing steps of a successful software update performed by a device, in accordance with one or more techniques described in this disclosure. The command-line output in example of FIG. 4 may correspond to steps performed by computing device 200 that represents a non-limiting example of any computing device of FIG. 1, such as device 4.

In the example of FIG. 4, update module 224 of computing device 200 may authenticate whether the device is authorized to access the data store (e.g., identity hub). For example, update module 224 may cause communication unit(s) 206 to communicate with DID resolver 18 to resolve DID 29 of data store 12. Update module 224 may obtain a message including a DID document of data store 12 and determine a service endpoint (e.g., host device of data store 12) from the DID document. Update module 224 may cause communication unit(s) 206 to communicate with data store 12 to request for a verifiable credential for a software update from a software publisher. For example, update module 224 determines the service endpoint using the "HostServiceEndpoint" property of the DID document and sends an HTTP POST request including a verifiable credential for computing device 200 (e.g., verifiable credential 13 of FIG. 1), as the body of the request and containing the DID of computing device 200 (e.g., DID 19 of FIG. 1).

The data store returns verifiable credential (e.g., verifiable credential 14 of FIG. 1) of the software update to device 4. For example, data store 12 may return verifiable credential 14 including a URL (e.g., "imageURL") to a location to obtain the new software file/image, and one or more file verifiers (e.g., "imageSignature", "type", "publicKeyHex"). Update module 224 verifies the message including the verifiable credential (e.g., verifiable credential 14) returned from data store using a key from the verifiable credential (e.g., "publicKeyHex").

Update module 224 determines whether the software update is newer than the current software installed on the device. In this example, update module 224 determines that the latest version is '2.0.0' and the current version of computing device 200 is version '1.0.0.' In response to determining that the software update is a newer version, update module 224 obtains the software update by resolving a DID of the software publisher (e.g., DID 9 of FIG. 1) (e.g., determined from verifiable credential 14 of the software update) to an associated DID document of software publisher 6 and uses, for example, a key specified in the DID document of the software publisher to verify verifiable credential 14 for the software update. If verifiable credential 14 for the software update is verified, update module 224 instructs computing device 200 to download the software file/image from a URL included in verifiable credential 14 for the software update (e.g., "imageURL") (e.g., in this example, https://file-examples.com . . . ), checks the software file/image against the file verifiers (e.g., "imageSignature", "type", "publicKeyHex")), and, if verified, installs the software file/image.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:
1. A method comprising:
sending, by a device and to a data store, a request for a software update published by a software publisher, wherein the request includes a verifiable credential for the device, and wherein the verifiable credential for the device includes a Decentralized Identifier (DID) of the device;

receiving, by the device and from the data store, a verifiable credential for the software update, wherein the verifiable credential for the software update includes a DID of the software publisher;

determining, by the device, whether the software update is newer than a current software on the device;

obtaining, by the device, the software update from the software publisher from a location specified by the verifiable credential for the software update, wherein obtaining the software update from the software publisher comprises:

resolving, by the device, the DID of the software publisher to an associated DID document of the software publisher, wherein the DID of the software publisher is included in the verifiable credential for the software update, verifying, by the device, the verifiable credential for the software update using one or more keys specified in the DID document of the software publisher, and in response to verifying the verifiable credential for the software update, obtaining the software update from the software publisher;

verifying, by the device, the software update based on the verifiable credential for the software update; and in response to verifying the software update based on the verifiable credential for the software update, installing, by the device, the software update.

2. The method of claim 1, wherein the verifiable credential for the software update further comprises:

one or more file verifiers for respective files of the software update.

3. The method of claim 2, wherein each of the one or more file verifiers comprises a digital signature of a software image that is a corresponding one of the respective files of the software update and a public key.

4. The method of claim 2, wherein verifying the software update comprises:

verifying the respective files of the software update against the one or more file verifiers.

5. The method of claim 1, wherein the verifiable credential for the software update further comprises:

a version identifier for a version of the software update, and wherein determining whether the software update is newer than the current software of the device comprises comparing the version identifier of the software update with a version identifier of the current software on the device.

6. The method of claim 1 further comprising:

receiving, by the device and from the data store, a verifiable credential for the data store, wherein the verifiable credential for the data store authorizes the device to access the data store, and wherein the verifiable credential for the data store includes a DID of the data store.

7. The method of claim 6 further comprising:

resolving, by the device, the DID of the data store to an associated DID document of the data store; and sending, by the device and to the data store, a request for the verifiable credential for the software update based on a service endpoint specified in the DID document of the data store, wherein the service endpoint is a host device of the data store.

8. The method of claim 7, wherein sending the request for the verifiable credential for the software update comprises:

sending, by the device and to the data store, a Hypertext Transfer Protocol (HTTP) POST request, wherein the HTTP POST request includes a body specifying the verifiable credential for the device.

9. A method comprising:

receiving, by a data store and from a software publisher, a verifiable credential for a software update published by the software publisher, wherein the verifiable credential for the software update comprises a Decentralized Identifier (DID) of the software publisher and a location to obtain the software update;

receiving, by the data store and from a device, a request for the software update, wherein the request for the software update includes a verifiable credential for the device, and wherein the verifiable credential for the device includes a DID of the device and;

verifying, by the data store, the request based on the DID of the device, wherein verifying the request based on the DID of the device comprises:

resolving, by the data store, the DID of the device to an associated DID document of the device, verifying, by the data store, the request using a key from the DID document of the device, and in response to verifying the request using the key from the DID document of the device, performing, by the data store, a lookup of the verifiable credential for the software update; and in response to verifying the request, returning, by the data store and to the device, the verifiable credential for the software update.

10. The method of claim 9, wherein the verifiable credential for the software update further comprises:

one or more file verifiers for respective files of the software update.

11. The method of claim 10, wherein the one or more file verifiers comprises a digital signature of a software image and a public key.

12. The method of claim 9, wherein the verifiable credential for the software update further comprises:

a version identifier of a version of the software update.

13. A device comprising:

a memory; and processing circuitry in communication with the memory, the processing circuitry being configured to:

send, to a data store, a request for a software update published by a software publisher, wherein the request includes a verifiable credential for the device, and wherein the verifiable credential for the device includes a Decentralized Identifier (DID) of the device;

receive, from the data store, a verifiable credential for the software update, wherein the verifiable credential for the software update includes a DID of the software publisher;

determine whether the software update is newer than a current software on the device;

obtain the software update from the software publisher from a location specified by the verifiable credential for the software update, wherein, to obtain the software update from the software publisher, the processing circuitry is further configured to:

resolve the DID of the software publisher to an associated DID document of the software publisher, wherein the DID of the software publisher is included in the verifiable credential for the software update, verify the verifiable credential for the software update using one or more keys specified in the DID document of the software publisher, and in response to verifying the verifiable credential for the software update, obtain the software update from the software publisher;

verify the software update based on the verifiable credential for the software update; and in response to verifying the software update based on the verifiable credential for the software update, install the software update.

14. The device of claim 13, wherein the verifiable credential for the software update further comprises:

one or more file verifiers for respective files of the software update.

15. The device of claim 14, wherein each of the one or more file verifiers comprises a digital signature of a software image that is a corresponding one of the respective files of the software update and a public key.

16. The device of claim 13, wherein the verifiable credential for the software update further comprises:

a version identifier for a version of the software update, and wherein determining whether the software update is newer than the current software of the device comprises comparing the version identifier of the software update with a version identifier of the current software on the device.

17. The device of claim 13, wherein the processing circuitry is further configured to:

receive, from the data store, a verifiable credential for the data store, wherein the verifiable credential for the data store authorizes the device to access the data store, and wherein the verifiable credential for the data store includes a DID of the data store;

resolve the DID of the data store to an associated DID document of the data store; and send, to the data store, a request for the verifiable credential for the software update based on a service endpoint specified in the DID document of the data store, wherein the service endpoint is a host device of the data store.

* * * * *